(12) United States Patent
Guey et al.

(10) Patent No.: US 8,274,995 B2
(45) Date of Patent: Sep. 25, 2012

(54) CYCLIC PREFIX FOR NON-CONTIGUOUS SIGNAL TRANSMISSION

(75) Inventors: Jiann-Ching Guey, Fremont, CA (US); Havish Koorapaty, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 361 days.

(21) Appl. No.: 12/781,229

(22) Filed: May 17, 2010

(65) Prior Publication Data

US 2011/0280181 A1 Nov. 17, 2011

(51) Int. Cl.
*H04J 3/24* (2006.01)
(52) U.S. Cl. ..................... 370/473; 370/349
(58) Field of Classification Search .............. 370/349, 370/473, 481, 482, 208, 203
See application file for complete search history.

(56) References Cited

U.S. PATENT DOCUMENTS

| 7,864,663 B2* | 1/2011 | Dent | 370/210 |
| 8,126,070 B2* | 2/2012 | Hyllander et al. | 375/260 |
| 8,189,719 B2* | 5/2012 | Barriac et al. | 375/343 |
| 2002/0186715 A1* | 12/2002 | Mestdagh | 370/480 |
| 2004/0081131 A1* | 4/2004 | Walton et al. | 370/344 |

* cited by examiner

*Primary Examiner* — Brenda H Pham

(57) ABSTRACT

Transmitted signals are modified to facilitate the emulation of circular convolution in non-contiguous transmission environments. These modified signals may be derived from well-known signature sequences. In an exemplary method, a tail portion of a final segment of a base signal is prefixed to an initial segment of the base signal, to form a first transmit segment. One or more additional transmit segments are formed by prefixing, to each of the one or more segments of the base signal other than the initial segment, a tail portion of the immediately preceding segment of the base signal. The transmit segments so formed are transmitted in respective ones of the plurality of non-contiguous transmit-time intervals. Corresponding methods for receiving the transmitted segments and reconstructing the base signal are also described, as are corresponding transmitting and receiving apparatuses.

12 Claims, 5 Drawing Sheets

US 8,274,995 B2

CYCLIC PREFIX FOR NON-CONTIGUOUS SIGNAL TRANSMISSION

TECHNICAL FIELD

The present invention relates generally to wireless communication systems and, more particularly, to signal processing techniques for emulating circular convolution using signals transmitted in non-contiguous transmission intervals.

BACKGROUND

The term "cyclic prefix" is used in the communications field to refer to the affixing of a tail section of a signal at the beginning of the original signal, to create a slightly lengthened signal. This technique is often used in communication systems to emulate the circular convolution of a transmitted signal with the time-invariant impulse response of the communication channel, since the periodic nature of circular convolution provides many advantages in discrete signal processing. Cyclic-prefix techniques are applied, for example, in wireless communication systems using Orthogonal Frequency Division Multiplexing (OFDM), such as in the Long-Term Evolution (LTE) wireless systems developed by members of the $3^{rd}$-Generation Partnership Project (3GPP). Cyclic prefixes are also used in the design of signature sequences, which are widely used in communication systems for the purposes of synchronization, signal identification, and the like.

In OFDM systems, the use of cyclic prefixes "attached" to the beginning of each transmitted OFDM symbol allows the receiver to treat the received symbol as though it were a circular convolution of the transmitted symbol with the communication channel response. As a result, the receiver can use a simple Discrete Fourier Transform (DFT) to demodulate the received signal. In signature sequence design applications, the use of a cyclic prefix allows a "root signal" to be subjected to different circular time shifts and frequency shift, to create multiple signature sequences from the same root sequence. If the root sequence is properly chosen, these multiple versions can be used to identify multiple devices or signal sources.

In the standardization of Long-Term Evolution (LTE) wireless communications technology there have been efforts to design signature sequences to be used for mobile positioning. The sequences for this application need to occupy a time slot in which some segments are already occupied by the transmission of existing Cell-specific Reference Symbols (CRS). Accordingly, it is desirable to keep the new sequences to be used for positioning orthogonal to the existing CRS in time. Thus, any new sequence that is designed for positioning applications will likely not be transmitted as a single continuous signal, due to the presence in each slot of OFDM symbols carrying the existing CRS. Since the signature sequence will comprise non-contiguous segments, conventional approaches such as those based on the cyclic-prefix Zadoff-Chu sequence set are no longer applicable. Instead, some form of frequency hopping pattern is likely to be used, potentially leading to degraded performance due to the non-ideal auto-correlation characteristics of the sequence.

When a frequency-hopping pattern is used for a signature sequence, the auto-correlation properties that determine the performance of the signature sequence are generally not as good as those for other time-domain-based sequences, such as the m-sequence or the Zadoff-Chu sequence. This is due largely to the limitations of the signal structure, which allows only one of a finite number of sinusoids to be transmitted in a given interval.

It has been shown that a large set of sequences with ideal circular auto- and cross-correlation functions can be derived from a properly chosen root sequence by introducing unique cyclic time-frequency shifts. These unique sequences can be used for identification and synchronization purposes, and generally have better properties than frequency-hopping sequences. However, these sequences cannot be used in non-contiguous transmission situations.

SUMMARY

In various embodiments of the present invention, signals are modified to facilitate the emulation of circular convolution in non-contiguous transmission environments. In some embodiments, these modified signals may be derived from signature sequences that are currently used in applications where the sequence is transmitted contiguously. As described more fully in the detailed description below, cyclic prefixes are used to facilitate this emulation of circular convolution for a signal transmitted through a dispersive channel in several non-contiguous transmission intervals.

In some embodiments of the present invention, a method of transmitting a signal in a plurality of non-contiguous transmit-time intervals such that each of the non-contiguous transmit-time intervals carries a distinct one of a corresponding plurality of segments of the signal comprises the prefixing, to an initial segment of the signal, a tail portion of a final segment of the signal, to form a first transmit segment. This method further comprises prefixing, to each of the one or more segments of the signal other than the initial segment, a tail portion of the immediately preceding segment of the signal, to form corresponding one or more additional transmit segments, and transmitting each of the first transmit segment and the one or more additional transmit segments in respective ones of the plurality of non-contiguous transmit-time intervals. In some embodiments, the signal comprises one of a pre-determined set of signature sequences; in some of these and in some other embodiments the transmit segments are transmitted in the same order as the corresponding segments of the signal appear in the signal itself.

In some embodiments, all of the prefixed tail portions are of a single, pre-determined length. In some of these embodiments, the pre-determined length is selected based on an estimated or expected propagation delay spread corresponding to the transmission of the first transmit segment and the one or more additional transmit segments. In some embodiments, the signal comprises one or more orthogonal-frequency-division-multiplexed (OFDM) symbols.

Also described in detail below are methods for receiving a signal transmitted in a plurality of non-contiguous transmit-time intervals, wherein each of the non-contiguous transmit-time intervals carries a transmitted segment comprising a distinct one of a corresponding plurality of segments of the signal, each distinct one prefixed by a tail portion of a different one of the plurality of segments of the signal. An exemplary method comprises receiving the transmitted segments from the non-contiguous transmit-time intervals and, for each of the received transmitted segments, extracting a fractional portion having a length equal to the corresponding distinct one of the segments of the signal. The fractional portions are then combined in a pre-determined order, to form a received version of the signal. In some, but not all embodiments, the pre-determined order is the order in which the transmitted segments are received. In several embodiments, the method further comprises performing a discrete Fourier transform (DFT) on the received version of the signal, to form a demodulated signal. In some of these, as well as in some other embodiments, the method comprises comparing the received version of the signal to one or more pre-determined signature sequences to determine a transmitter identity corresponding to the transmitted sequences. In others, the method further comprises correlating the received version of the signal with one or more pre-determined sequences to estimate a time-of-arrival corresponding to the transmitted sequences.

Transmitter and receiver apparatuses configured to carry out one or more of the methods summarized above are also disclosed. Of course, the present invention may be carried out in other ways than those specifically set forth herein without departing from essential characteristics of the invention as set forth in the appended claims. Upon reading the following description and viewing the attached drawings, the skilled practitioner will recognize that the described embodiments are illustrative and not restrictive, and that all changes coming within the scope of the appended claims are intended to be embraced therein.

DETAILED DESCRIPTION

As briefly described above, the use of cyclic prefixes attached to the beginning of each transmitted OFDM symbol allows a receiver to treat the received symbol as though it were a circular convolution of the transmitted symbol with the communication channel response. This simplifies the receiver processing in many instances. For example, the use of cyclic prefixes in OFDM applications allows the receiver to use a simple discrete-Fourier-transform (DFT) process to demodulate received symbols.

Figure 1:
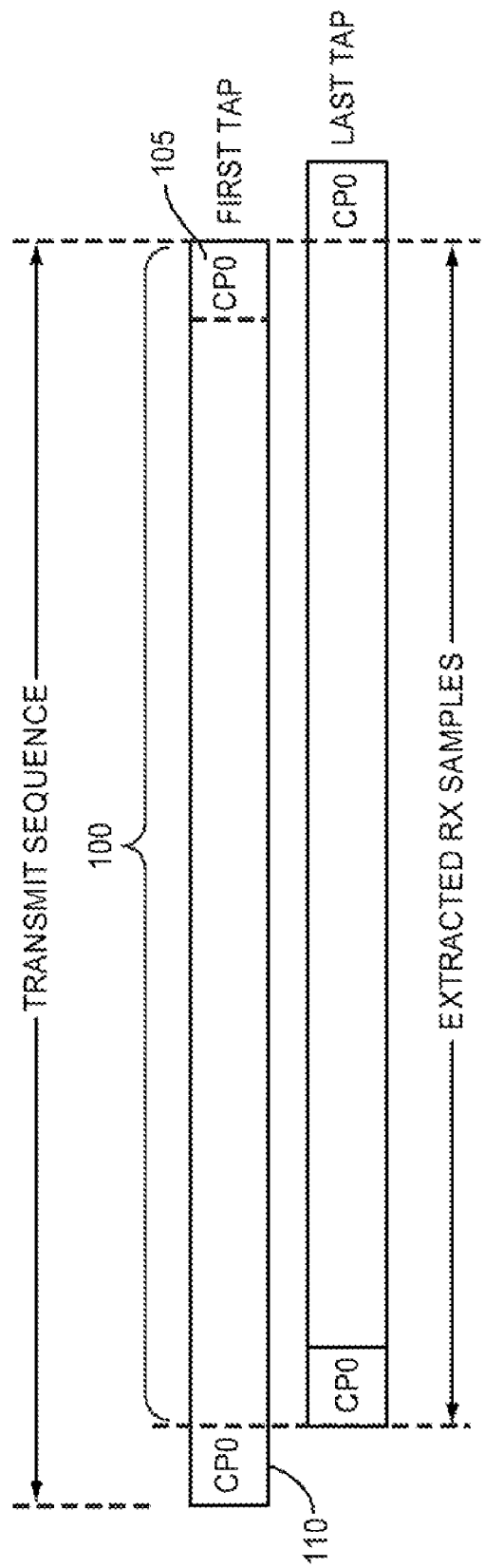
FIG. 1 illustrates the application of a cyclic prefix to a signal for continuous transmission.

To realize circular convolution in practice, a cyclic prefix having a length no less than the spread of the communication channel's impulse response can be added to the beginning of the transmit sequence. An example of this is shown in FIG. 1, where tail segment 105 of a base signal 100 is replicated and "attached," or prefixed, as a cyclic prefix 110 to the beginning of the illustrated transmit sequence. The receiver can then extract samples of the received version of the using a window having a duration equal to the length of the original signal (i.e., before the cyclic prefix is added). As long as the cyclic prefix length is greater than or equal to the channel's delay spread (the difference between the first and last taps), the extracted segment of receiver samples contains one full cycle of the transmit signal for all the multi-paths in the channel, and is equivalent to the circular convolution of the transmit sequence with the channel's impulse response. In FIG. 1, the illustrated receiver window is shown superimposed with the earliest received version of the signal (the first tap) as well as the latest received version of the signal (the last tap). In both of these extreme cases, the receiver window contains a full cycle of the circular transmitted signal.

Figure 2:
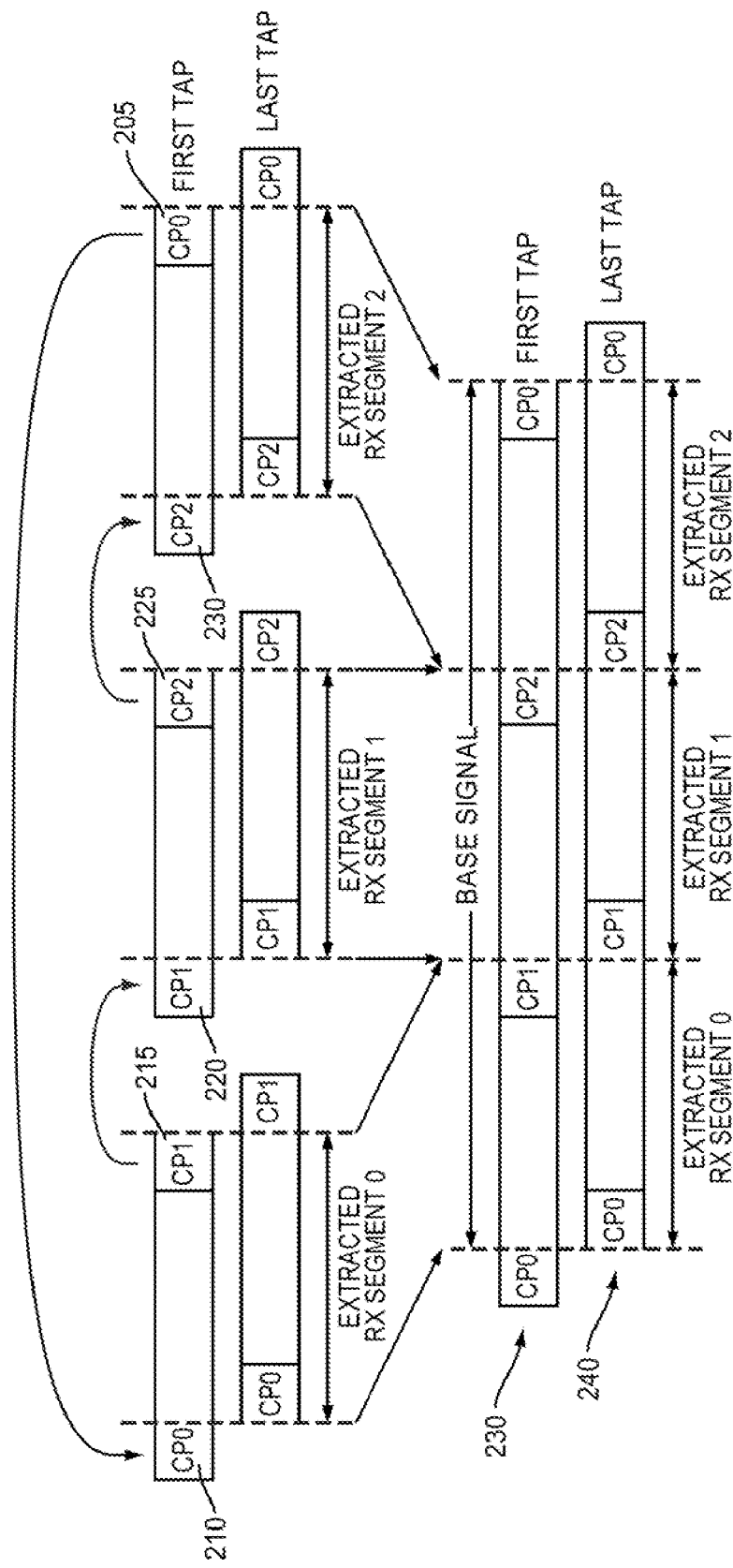
FIG. 2 illustrates the exemplary application of cyclic prefix to a signal for transmission as non-contiguous transmit segments.

If the transmitted signal is transmitted across two or more non-contiguous transmit-time intervals, the advantages of circular convolution can still be realized, using a generalization of the cyclic prefix principle. An example of this is shown in FIG. 2, which illustrates a signal segmented for transmission in three non-contiguous transmission windows. The cyclic prefix added to the beginning of each transmit segment is the last part of the preceding segment, with the cyclic prefix of the first segment being obtained from the tail portion of the last segment. Thus, tail portion 205 of the final transmit segment is added as cyclic prefix 210 to the beginning of the first transmit segment. Tail portion 215 from the first transmit segment is prefixed as cyclic prefix 220 to the beginning of the second transmit segment. Finally, tail portion 225 from the second transmit segment is replicated and added as cyclic prefix 230 to the beginning of the third transmit segments. The transmit segments, extended by the additions of the cyclic prefixes, can then be transmitted in non-contiguous transmit-time intervals.

At the receiver, a portion of each received segment is extracted and the rest discarded. Generally speaking, the length of the extracted portion will equal that of the corresponding transmit segment less the prefix. FIG. 2 illustrates the extraction of receive samples for each of the three transmitted segments, with the receive windows mapped against an early-arriving version 230 of the signal (corresponding to the shortest path and/or the first tap in a multi-tap receiver) and a late-arriving version 240 of the signal (corresponding to the longest path and/or the last tap of a multi-tap receiver). When properly positioned, the windows of extraction should each contain a cyclic shifted (and possibly gain adjusted) version of the original non-prefixed segment, for each multi-path in the channel. This is always possible as long as the length of the cyclic prefix is no less than the maximum delay spread of the channel. Extraction windows for the multiple segments should be spaced according to the original transmission intervals so that when the extracted segments (pictured in FIG. 2 as RX Segments 0, 1, and 2) are combined, they form a single segment equivalent to the circular convolution of the original base signal (i.e., before the cyclic prefixes are introduced) with the impulse response of the dispersive channel.

Figure 3:
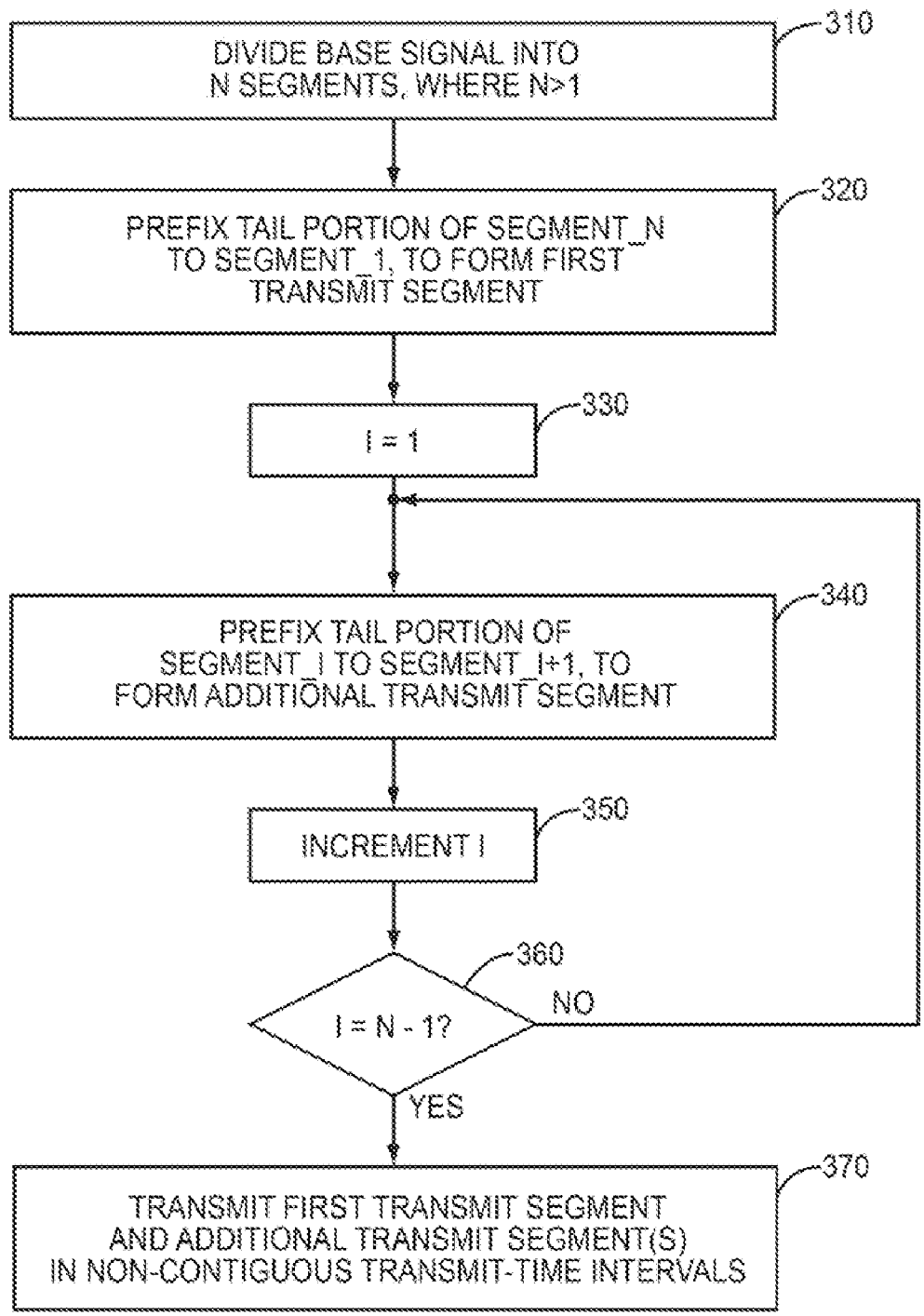
FIG. 3 is a process flow diagram illustrating an exemplary method for transmitting a signal in a plurality of non-contiguous transmit-time intervals.

With the example illustrated in FIG. 2 in mind, those skilled in the art will appreciate that FIG. 3 illustrates an exemplary method for preparing and transmitting a signal in a plurality of non-contiguous transmit-time intervals, such that each of the non-contiguous transmit-time intervals carries a distinct one of a corresponding plurality of segments of the signal. The illustrated process begins, as shown at block 310, with the dividing of the original, or "base" signal, into N segments, where N equals 2 or more. As shown at block 320, the tail portion of the final segment (segment N) is prefixed to the first segment of the base signal (segment 1), to form a first transmit segment.

The rest of the transmit segments are formed by prefixing the tail portion of each of the first N-1 segments to the following segment. An exemplary iterative algorithm for this process is shown at blocks 330 to 360 of FIG. 3. As shown at block 330, an index I is initialized to one. As shown at block 340, the tail portion of segment I (segment 1, on the first iteration) is prefixed to segment I+1 of the base signal, to form an additional transmit segment I+1. The index I is then incremented, as shown at block 350. If the incremented index is less than N-1, then the next transmit segment is formed, as shown at block 340. When the index I reaches N-1, then the prefixing process is complete, and the first transmit segment and the additional transmit segments are transmitted in non-contiguous transmit-time intervals, as shown at block 370.

The base signal that is segmented into a plurality of segments may be one of a pre-determined set of signature sequences, including those that are commonly used in applications where the sequence is transmitted as a single, contiguous, signal. Thus, techniques and sequences already developed for particular applications may be adapted, using the approaches described herein, for situations in which the sequences must be used in a non-contiguous transmission environment.

The technique described above and illustrated in FIG. 3 allows flexibility in how the sequence is transmitted. In some embodiments, the first transmit segment (i.e., the transmit segment corresponding to the beginning of the base signal) and the additional transmit segments are transmitted in the same order as the corresponding segments appear in the base signal. However, this order is not essential. Thus, these segments may be transmitted in any pre-determined order. The receiver can put the segments back together in the correct order, given information regarding the transmission order. Likewise, some embodiments of the techniques described above may use prefixed tail portions of a single, pre-determined length for all transmit segments, while others might use differing lengths for one or more transmit segments. In some embodiments, the pre-determined length is selected based on an estimated or expected propagation delay spread corresponding to the transmission of the transmit segments, while in others, the pre-determined length may be selected to accommodate a worst-case delay spread.

In some embodiments, such as some of those involving LTE wireless communication systems, the first transmit segment and the one or more additional transmit segments comprise one or more orthogonal-frequency-division-multiplexed (OFDM) symbols. However, the use of the techniques described herein in systems that do not use OFDM is also envisioned.

Figure 4:
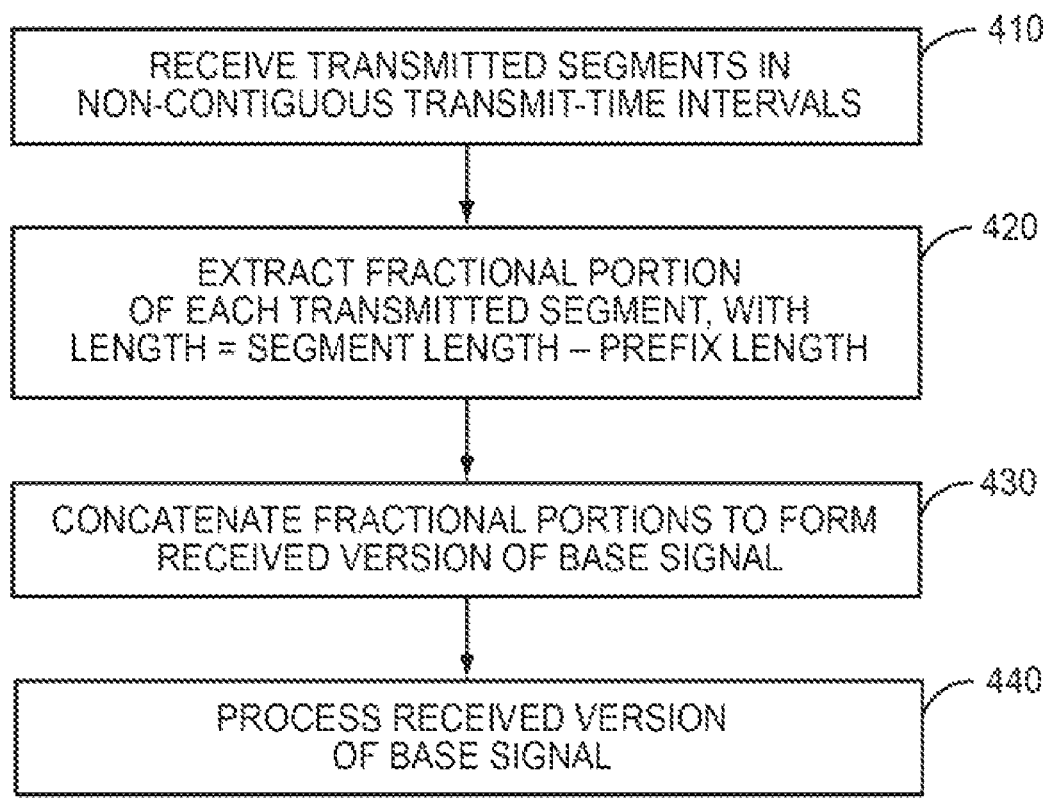
FIG. 4 is a process flow diagram illustrating an exemplary method for receiving a signal transmitted in a plurality of non-contiguous transmit-time intervals.

FIG. 4 illustrates an exemplary method, such as might be implemented using a receiver in a wireless mobile terminal, for receiving a signal transmitted in a plurality of non-contiguous transmit-time intervals, wherein each of the non-contiguous transmit-time intervals carries a transmitted segment comprising a distinct one of a corresponding plurality of segments of a base signal. Each of these segments of the base signal is prefixed by a tail portion of a different one of the plurality of segments of the base signal. (In at least some embodiments, then, the transmitted segments are formed in the manner described above in reference to FIG. 3.)

The illustrated process begins, as shown at block 410, with the receiving of the transmitted segments in non-contiguous transmit-time intervals. The transmitted segments may be transmitted in a pre-determined pattern of transmit-time intervals, in some embodiments, or the receiver may be informed of the specific locations of the transmitted segments in others. In any case, the illustrated process continues, as shown at block 420, with the extraction of a fractional portion of each transmitted segment. Typically, as suggested by FIG. 2, the fractional portion of the transmitted segment will have a length equal or approximately equal to the length of the segment from the original base sequence that was used to form the transmitted segment, i.e., before the cyclic prefix was added. In other words, the length of the fractional portion extracted from the transmitted segment will generally be the length of the transmitted segment less the length of the cyclic prefix.

As shown at block 430, the extracted fractional portions of the received segments may then be concatenated, to form a received version of the base signal. Those skilled in the art will appreciate that the concatenation of the extracted segment portions may be in the same order that the segments are received, in some embodiments. However, some other pre-determined order may be used, in other embodiments. The received version of the base signal is then processed, as shown at block 440. In several embodiments, this processing includes performing a discrete Fourier transform (DFT) on the received version of the base signal. As discussed above, the segmenting techniques described herein facilitate the simplification of demodulating the received signal, as the received signal may be treated as though it were circularly convolved with impulse response of the communications channel.

Other processing of the received version of the base signal can include, for example, comparing the received version of the base signal to one or more pre-determined signature sequences, to determine a transmitter identity corresponding to the transmitted sequences. In other embodiments, this processing might instead comprise correlating the received version of the base signal with one or more pre-determined sequences to estimate a time-of-arrival corresponding to the transmitted sequences; this time-of-arrival might be used in some embodiments to determine a location for the receiver and/or the transmitter.

Figure 5:
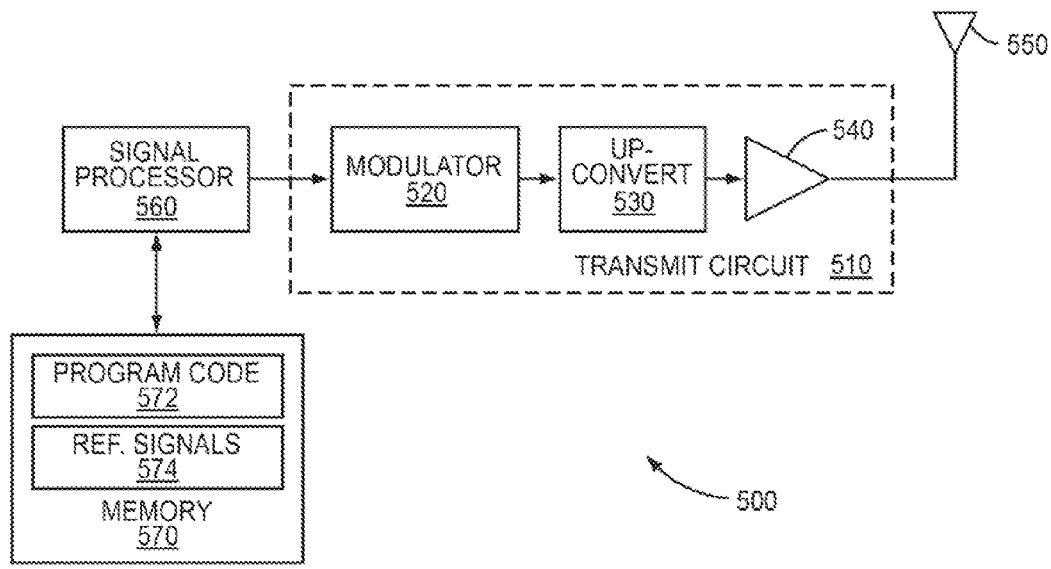
FIG. 5 illustrates an exemplary transmitter apparatus.
Figure 6:
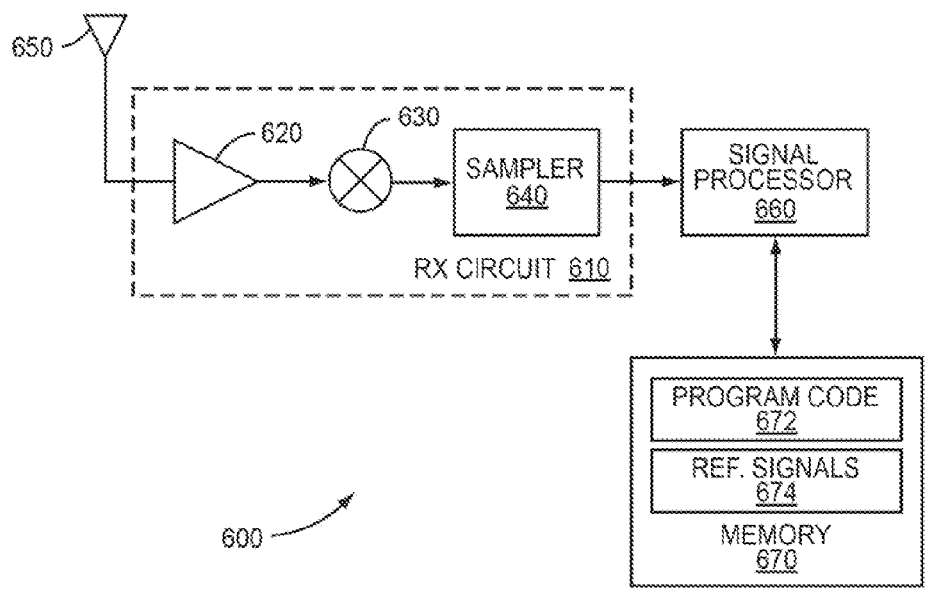
FIG. 6 illustrates an exemplary receiver apparatus.

A transmitter apparatus 500 and a receiver apparatus 600 are illustrated in FIGS. 5 and 6, respectively. In some embodiments of the invention, the techniques described above may be implemented in receiver and/or transmitter devices like those pictured. In applications of these techniques to downlink (base station to mobile station) communications, the transmitter apparatus 500 of FIG. 5 may correspond to a base station (e.g., an LTE evolved NodeB, or e-NodeB), while the receiver 600 of FIG. 6 may correspond to a mobile station. However, nothing limits the techniques described herein to downlink communications, thus receiver 600 may correspond to a base station or other fixed station, in some embodiments, while transmitter 500 may correspond to a mobile station in others.

FIG. 5 illustrates an exemplary block diagram of a transmitter 500 configured to carry out the techniques described herein for transmitting a signal using a plurality of non-contiguous transmit-time intervals. Transmitter 500 includes a transmit circuit 510, which includes analog and radio-frequency components for converting a baseband information signal, supplied by signal processor 560, into a radio-frequency signal for transmission over the air by antenna 550. Transmit circuit 510 includes modulator circuit 520, up-converter circuit 530, and power amplifier circuit 540. Those skilled in the art will appreciate that the details of transmit circuit 510 will depend on such factors as the supported frequency band or bands, supported wireless communication standards (such as 3GPP's LTE specifications), and the like. However, those details are not necessary to a full understanding of the present invention.

One or more of the techniques described above for segmenting a signal and adding cyclic prefixes are implemented using signal processing circuit 560, which may comprise one or more microprocessors, microcontrollers, digital signal processors, or the like, and which may be implemented in an application-specific integrated circuit (ASIC) in some embodiments. Signal processor 560 is configured with program code 572, stored in memory 570 along with one or more pre-determined reference signals 574, which may comprise signature sequences or other base signal sequences. Memory 570 may comprise one or more memory devices, including one or more of read-only memory (ROM), random-access memory (RAM), flash memory, optical and/or magnet storage, and the like, and may be implemented in various embodiments as one or more separate devices and/or combined, in whole or in part, with signal processor 560 in an ASIC, or a system-on-a-chip (SoC).

Program code 572 includes program instructions for carrying out any of the techniques described above for transmitting a signal in a plurality of non-contiguous transmit-time intervals, and may also comprise program instructions for controlling transmit circuit 510, implementing one or more protocol stacks for a wireless communications link, etc. In particular, program code 572 comprises, in some embodiments, instructions for forming a first transmit segment by prefixing, to an initial segment of a base signal, a tail portion of a final segment of the base signal, as well as instructions for forming one or more additional transmit segments by prefixing, to each of the one or more segments of the base signal other than the initial segment, a tail portion of the immediately preceding segment of the base signal. In some of these embodiments, the program code 572 may further comprise program instructions for controlling transmit circuit 510 to transmit each of the first transmit segment and the one or more additional transmit segments in respective ones of the plurality of non-contiguous transmit-time intervals. In other embodiments, one or more additional processing circuits or other control circuits may control all or part of the operation of transmit circuit 510.

The receiver apparatus 600 of FIG. 6 may be understood in a similar manner, as FIG. 6 illustrates an exemplary block diagram of a receiver 600 configured to carry out the techniques described herein for receiving a signal transmitted in a plurality of non-contiguous transmit-time intervals (e.g., by the transmitter 500 of FIG. 5). Receiver apparatus 600 includes a receiver (RX) circuit 610, which includes analog and radio-frequency components for converting a radio-frequency signal, captured by receive antenna 650, into a baseband information signal for processing by signal processing circuit 660. RX circuit 610 includes low-noise amplifier circuit 620, downconverter circuit 630, and sampler circuit 640; sampler circuit 640 converts the analog signal supplied by downconverter circuit 630 into digital form for processing by signal processing circuit 660, which may be configured to perform various filtering and/or other signal conditioning tasks on the received samples. Once again, those skilled in the art will appreciate that the details of RX circuit 610 will depend on such factors as the supported frequency band or bands, supported wireless communication standards (such as 3GPP's LTE specifications), and the like. Again, those details are not necessary to a full understanding of the present invention.

One or more of the techniques described above for processing a signal received in a plurality of non-contiguous transmit-time intervals are implemented using signal processing circuit 660, which may comprise one or more microprocessors, microcontrollers, digital signal processors, or the like, and, like signal processor 560, which may be implemented in an application-specific integrated circuit (ASIC) in some embodiments. Signal processor 660 is configured with program code 672, stored in memory 670 along with one or more pre-determined reference signals 674, which may comprise signature sequences or other base signal sequences. Like memory 570, memory 670 may comprise one or more memory devices, including one or more of read-only memory (ROM), random-access memory (RAM), flash memory, optical and/or magnet storage, and the like, and may be implemented in various embodiments as one or more separate devices and/or combined, in whole or in part, with signal processor 660 in an ASIC, or a system-on-a-chip (SoC).

Program code 672 includes program instructions for carrying out any of the techniques described above for receiving a base signal transmitted in a plurality of non-contiguous transmit-time intervals and processing the received transmit segments to recover a received version of the base signal, and may also comprise program instructions for controlling RX circuit 610, implementing one or more protocol stacks for a wireless communications link, etc. In particular, program code 672 comprises, in some embodiments, program instructions for controlling RX circuit 610 to receive the transmitted segments from the non-contiguous transmit-time intervals, as well as program instructions for forming a received version of the base signal by extracting from each of the received transmitted segments a fractional portion, the fractional portion having a length equal to the corresponding distinct one of the segments of the base signal, and combining the fractional portions in a pre-determined order. In some embodiments, the program code may comprise further instructions for processing the received version of the base signal, such as instructions for demodulating the signal using a discrete Fourier transform, instructions for comparing the received version of the reference signal to one or more pre-determined signature sequences (e.g., one or more of reference signals 674), to determine a transmitter identity, and/or or instructions for correlating the received version of the base signal with one or more pre-determined sequences (e.g., one or more of reference signals 674) to estimate a time-of-arrival corresponding to the transmitted sequence.

Those skilled in the art will appreciate that the circuits of transmitter apparatus 500 and receiver 600 may be configured in ways that vary in certain details from the broad descriptions given above. For instance, one or more of the signal processing and control functionalities described above may be implemented using dedicated hardware, rather than a microprocessor configured with program instructions. Such variations, and the engineering tradeoffs associated with each, will be readily appreciated by the skilled practitioner. Indeed, all of the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of transmitting a signal in a plurality of non-contiguous transmit-time intervals such that each of the non-contiguous transmit-time intervals carries a distinct one of a corresponding plurality of segments of the signal, the method comprising:
   prefixing, to an initial segment of the signal, a tail portion of a final segment of the signal, to form a first transmit segment;
   prefixing, to each of the one or more segments of the signal other than the initial segment, a tail portion of the immediately preceding segment of the signal, to form corresponding one or more additional transmit segments; and
   transmitting each of the first transmit segment and the one or more additional transmit segments in respective ones of the plurality of non-contiguous transmit-time intervals.

2. The method of claim 1, wherein the signal comprises one of a pre-determined set of signature sequences.

3. The method of claim 1, wherein the first transmit segment and the one or more additional transmit segments are transmitted in the order in which the corresponding segments of the signal appear in the signal.

4. The method of claim 1, wherein all of the prefixed tail portions are of a single, pre-determined length.

5. The method of claim 4, further comprising selecting the pre-determined length based on an estimated or expected propagation delay spread corresponding to the transmission of the first transmit segment and the one or more additional transmit segments.

6. The method of claim 1, wherein the signal comprises one or more orthogonal-frequency-division-multiplexed (OFDM) symbols.

7. A transmitter apparatus configured to transmit a signal in a plurality of non-contiguous transmit-time intervals such that each of the non-contiguous transmit-time intervals carries a distinct one of a corresponding plurality of segments of the signal, the transmitter apparatus comprising:

a signal processing circuit configured to form a first transmit segment by prefixing, to an initial segment of the signal, a tail portion of a final segment of the signal, and to form one or more additional transmit segments by prefixing, to each of the one or more segments of the signal other than the initial segment, a tail portion of the immediately preceding segment of the signal; and a transmit circuit configured to transmit each of the first transmit segment and the one or more additional transmit segments in respective ones of the plurality of non-contiguous transmit-time intervals.

8. The transmitter apparatus of claim 7, wherein the signal comprises one of a pre-determined set of signature sequences.

9. The transmitter apparatus of claim 7, wherein the signal processing circuit is configured to supply the first transmit segment and the one or more additional transmit segments to the transmit circuit, in the order in which the corresponding segments of the signal appear in the signal.

10. The transmitter apparatus of claim 7, wherein all of the prefixed tail portions are of a single, pre-determined length.

11. The transmitter apparatus of claim 10, wherein the signal processing circuit is further configured to select the pre-determined length based on an estimated or expected propagation delay spread corresponding to the transmission of the first transmit segment and the one or more additional transmit segments.

12. The transmitter apparatus of claim 7, wherein the signal comprises one or more orthogonal-frequency-division-multiplexed (OFDM) symbols.

* * * * *